(12) United States Patent
Uruma (10) Patent No.: US 8,836,968 B2
(45) Date of Patent: Sep. 16, 2014

(54) ELECTRONIC APPARATUS HAVING AUTHENTICATION FUNCTION

(75) Inventor: Shuichi Uruma, Kawaguchi (JP)

(73) Assignee: Canon Kabushiki Kaisha, Tokyo (JP)

( * ) Notice: Subject to any disclaimer, the term of this patent is extended or adjusted under 35 U.S.C. 154(b) by 156 days.

(21) Appl. No.: 13/551,204

(22) Filed: Jul. 17, 2012

(65) Prior Publication Data

US 2013/0044344 A1 Feb. 21, 2013

(30) Foreign Application Priority Data

Aug. 16, 2011 (JP) .................................. 2011-178110

(51) Int. Cl.
*G06K 15/00* (2006.01)
*G06F 21/31* (2013.01)
*G06F 21/60* (2013.01)
*G06K 1/00* (2006.01)

(52) U.S. Cl.
CPC .............. *G06F 21/608* (2013.01); *G06F 21/31* (2013.01); *G06F 2221/2117* (2013.01)
USPC .......................................... 358/1.14; 358/1.1

(58) Field of Classification Search
USPC ......... 358/1.1, 1.9, 1.13, 1.14, 1.15; 709/201, 709/203, 206, 217; 726/6; 455/411, 422; 370/331
See application file for complete search history.

(56) References Cited

U.S. PATENT DOCUMENTS

| 8,610,908 B2 * | 12/2013 | Dan ............................. 358/1.13 |
| 2006/0064753 A1 * | 3/2006 | Otake et al. .................... 726/19 |
| 2007/0103712 A1 * | 5/2007 | Corona ........................ 358/1.14 |
| 2008/0196090 A1 * | 8/2008 | Baron et al. ...................... 726/5 |
| 2013/0061319 A1 * | 3/2013 | Yasuhara ........................ 726/19 |

FOREIGN PATENT DOCUMENTS

JP 2005-341090 12/2005

* cited by examiner

*Primary Examiner* — Gabriel Garcia
(74) *Attorney, Agent, or Firm* — Fitzpatrick, Cella, Harper & Scinto (57) ABSTRACT

Upon receiving an instruction to execute a function from a user, it is determined whether the user who issued the execution instruction has logged in in the case where the function needs data that is set on a user-by-user basis, and if the user has logged in, data that has been set for the logged-in user is given to the corresponding function processing unit, and the instructed function is executed. In the case where the use who issued the execution instruction has not logged in, once the user has been authenticated, the data that has been set for the user is given to the corresponding function processing unit, and the instructed function is executed.

4 Claims, 6 Drawing Sheets

ELECTRONIC APPARATUS HAVING AUTHENTICATION FUNCTION

BACKGROUND OF THE INVENTION

1. Field of the Invention

The present invention relates to an electronic apparatus, such as an office apparatus or the like, that uses user-specific data and a method of controlling the electronic apparatus.

2. Description of the Related Art

Some office apparatuses such as multi-function processing apparatuses require a user to be authenticated in order for the user to be able to use functions of the apparatuses. This is done in order to limit the use of functions of the apparatus to some users, and to allow the user-specific data to be used by only the respective users. Generally, the timing when user authentication is performed is when the user starts to operate a multi-function processing apparatus. Moreover, there is a method in which the user authentication is only performed when the execution of a function whose use is limited is instructed by the user (for example, see Japanese Patent Laid-Open No. 2005-341090). In the case where the latter authentication method is adopted, the user needs to be authenticated in order to use his or her own data after once performing an operation for executing the function whose use is limited.

With the above conventional-described method, the user needs to perform the operation for executing the function whose use is limited and that is not related to the user's own data so as to be authenticated for using the data. This requires the user to perform an unnecessary operation, and thus is not preferable in terms of operability.

SUMMARY OF THE INVENTION

An aspect of the present invention is to eliminate the above-mentioned problems with the conventional technology.

A feature of the present invention is an effect of simplifying a user operation by automatic transition to log-in processing if a user has not logged in when the user gives an instruction to execute a function that uses the user's own data.

According to an aspect of the present invention, there is provided an electronic apparatus having an authentication function that can limit use for each function, comprising: a function processing unit configured to execute functions that the electronic apparatus has; a determination unit configured to, upon reception of an execution instruction to execute a function from a user, determine whether the function needs data that is set on a user-by-user basis; and a control unit configured to perform control so as to, in a case where the determination unit determines that the data that is set on a user-by-user basis is needed, determine whether the user who issued the execution instruction has been authenticated by the authentication function, and in a case of determining that the user has been authenticated, give data that is set for the authenticated user to the corresponding function processing unit, and cause the instructed function to be executed, and perform control so as to, in a case where the user who issued the execution instruction has not been subjected to authentication, cause the authentication function to perform authentication on the user, and in a case where the user is authenticated by the authentication function, give the data that is set for the authenticated user to the corresponding function processing unit, and cause the instructed function to be executed.

Further features of the present invention will become apparent from the following description of exemplary embodiments, with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a diagram showing an example of a common screen that can be used even if a user has not logged in.

FIG. 4 is a diagram showing an example of a personal screen specific to the user, which can be used only when the user is logged in.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all the combinations of the aspects that are described according to the following embodiments are necessarily required with respect to the means to solve the problems according to the present invention. In the following embodiments, a multi-function peripheral (MFP) is described as an example of an electronic apparatus of the present invention, but quite naturally, the present invention is not limited to the MFP.

Figure 1:
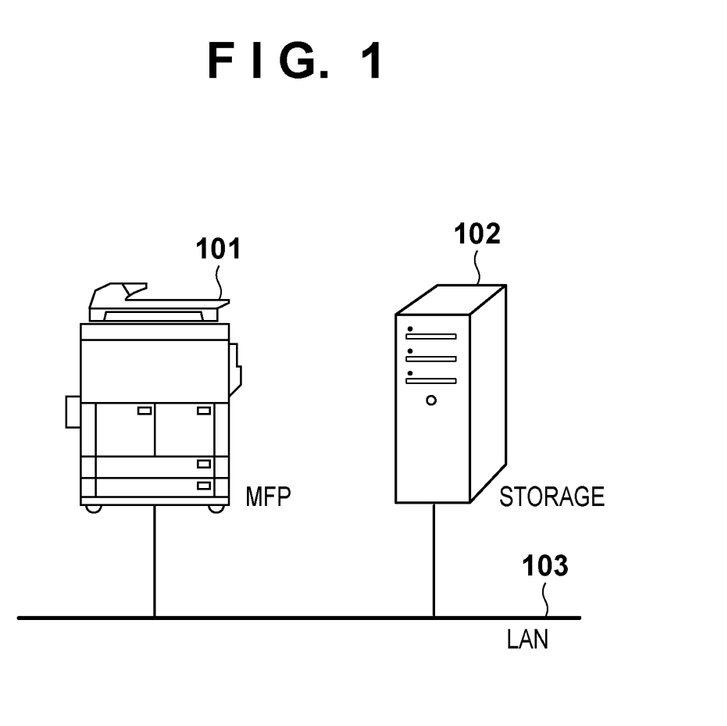
FIG. 1 is a diagram showing the overall configuration of a system according to an embodiment of the present invention.

FIG. 1 is a diagram showing the overall configuration of a system according to an embodiment of the present invention.

An MFP 101 (Multi-Function Peripheral) and a storage 102 are connected via a LAN 103, and can communicate with each other. The communication between the MFP 101 and the storage 102 may be performed via not only a LAN, but also a WAN, the Internet or the like. Moreover, the storage 102 may be provided in the MFP 101. Also, the MFP 101 is not limited to an MFP, and may be any office apparatus or the like that is equipped with multiple functions and that is used by multiple users.

Figure 8:
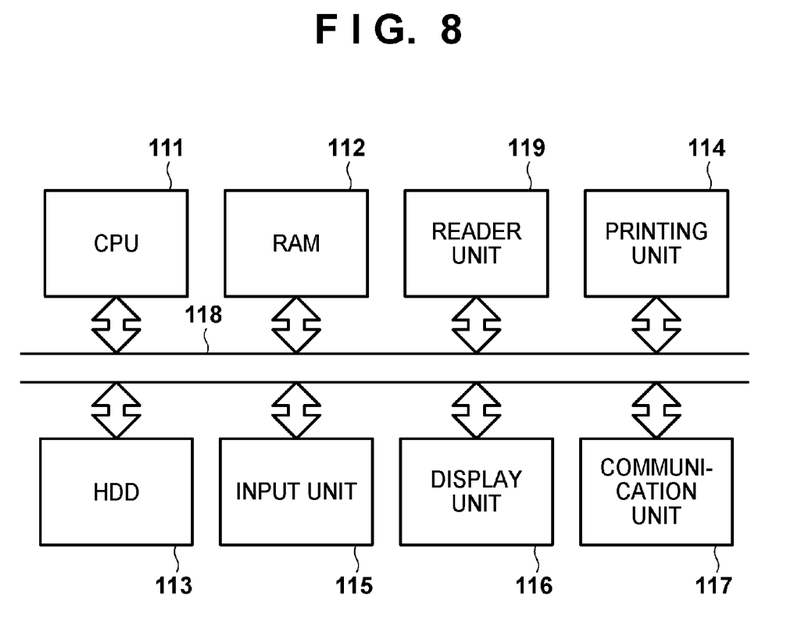
FIG. 8 is a block diagram showing a hardware configuration of the MFP according to the embodiments.

FIG. 8 is a block diagram showing a hardware configuration of the MFP 101 according to the present embodiments.

A CPU 111 executes a program that is deployed to a RAM 112, and controls overall operations of the MFP. The RAM 112 stores the program executed by the CPU 111 and provides a work area for the CPU 111. A hard disk drive (HDD) 113 stores an OS and various programs, and these programs are read out by a boot program and deployed to the RAM 112. It should be noted that the HDD 113 may be a non-volatile memory. An input unit 115 is operated by a user (including operators and installation personnel), and transmits data, commands and the like that have been input by the user to the CPU 111. A display unit 116 displays a UI (user interface) screen and the like. It should be noted that if the display unit 116 is a touch panel, the input unit and the display unit are an integrated unit. A reader unit 119 is a reader unit such as a scanner that reads an image on a paper sheet as electronic data. Moreover, a communication unit 117 performs communication with other apparatuses via a network. A printing unit 114 prints an image on a recording sheet by an electrophotographic method, an ink-jet method or the like. A main bus 118 connects these units with the CPU 111.

It should be noted that in the MFP 110 of the present embodiment, the CPU 111 controls the RAM 112, the HDD 113, the input unit 115, the display unit 116, the communication unit 117, and the reader unit 119 via the main bus 118, and executes various operations according to the present embodiment.

Figure 2A:
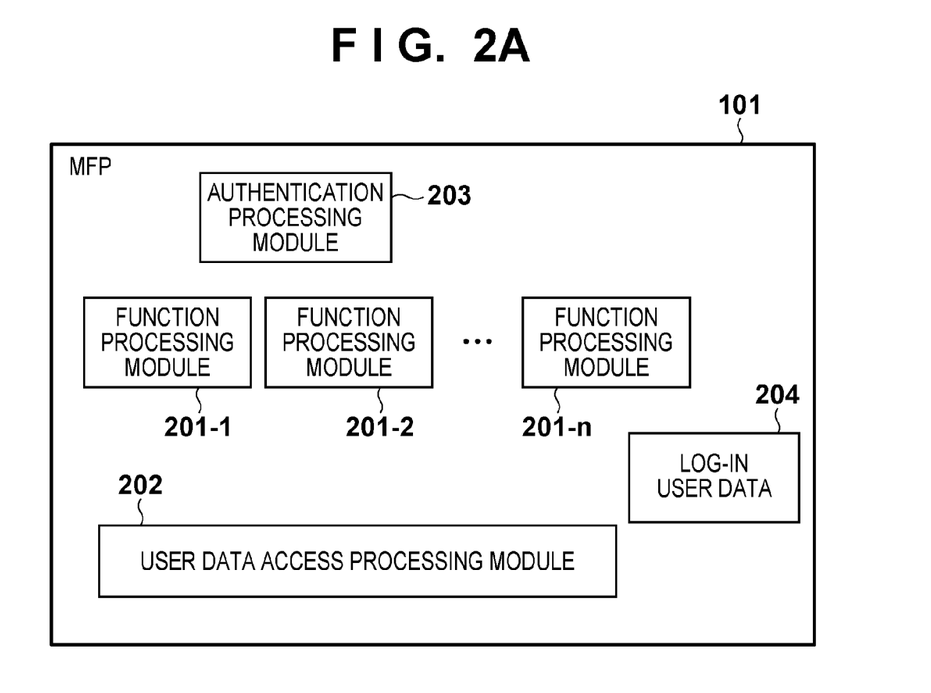
FIGS. 2A and 2B are diagrams showing a module configuration of an MFP and a storage.
Figure 2B:
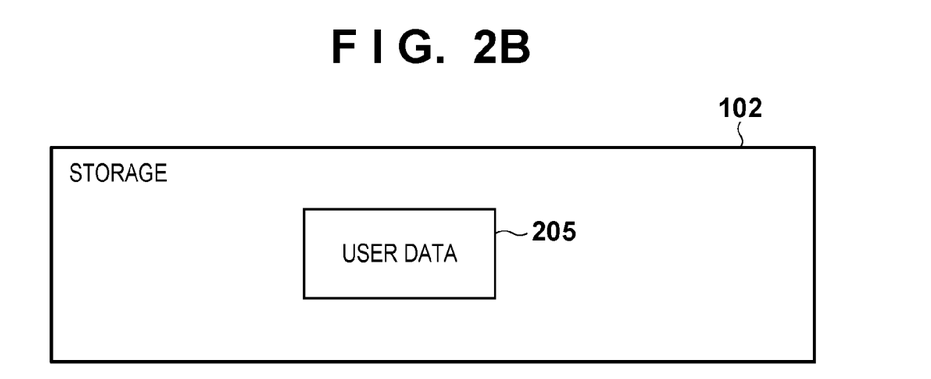

FIGS. 2A and 2B are diagrams showing module configurations of the MFP 101 and the storage 102. It should be noted that various hardware and software besides those shown in FIGS. 2A and 2B are required for operation of the MFP 101 and the storage 102, but are omitted here since they are not related to the essence of the present invention. It should also be noted that these modules are realized by the CPU 111 executing programs deployed to the RAM 112.

FIG. 2A illustrates the module configuration of the MFP 101, and function processing modules 201-1 to 201-*n* indicate modules that execute various functions of the MFP 101. Here, n of the function processing modules (n is an integer where n≥1) are provided. Specific examples of the function processing modules are a copy function, a facsimile (FAX) function, a portal screen and the like. A function processing module 201 in the following description is any of the function processing module 201-1 to 201-*n*.

There are the following two relationships between the function processing module 201 and user authentication (log-in) processing executed by an authentication processing module 203 that includes an authentication function.

(1) In the case of a setting in which log-in is required in accordance with a usage restriction setting that has been set in advance, the user cannot use the function provided by the function processing module 201 if the user has not logged in. After logging in, the user can use the function. In other words, in the case of a setting in which log-in is required, the user cannot use the function of the function processing module unless the user logs in. It should be noted that it is possible to set whether or not log-in is required for each of the function processing modules 201-1 to 201-*n* by the above-described usage restriction setting.

(2) In the case where the function processing module 201 has a function that uses user-specific data, the user cannot use the function if the user has not logged in. In other words, the user can use the function of the function processing module 201 that does not include a function that uses user-specific data even if the user has not logged in, but the user needs to log in if the user needs to use user-specific data.

The following is a description of this using the example of a portal screen.

The portal screen is for displaying a list of functions of the MFP 101 that are registered in advance, and for calling functions easily. Examples of the appearance of the portal screen are illustrated in FIGS. 3 and 4, and the case in which these two kinds of portal screens can be provided is described.

Figure 3:
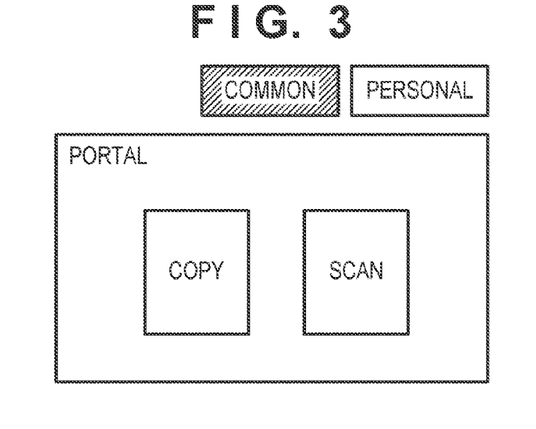
Figure 4:
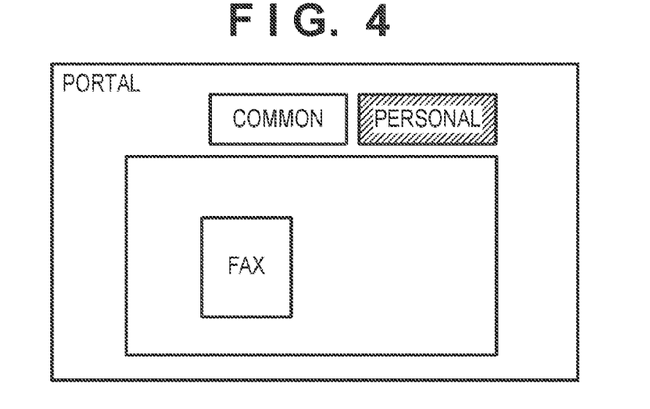

FIG. 3 is a diagram showing an example of a common screen that can be used even if a user has not logged in. Moreover, FIG. 4 is a diagram showing an example of a personal screen specific to the user, which can be used only when the user is logged in. It should be noted that these screens are displayed on the display unit 116.

In FIG. 3, buttons for calling a COPY function and a SCAN function, for example, are registered on the common screen. In FIG. 4, a button for calling a FAX function, for example, is registered on the personal screen. Which functions are registered on the personal screen depends on the user, and functions that are registered serves as user-specific data. In the case of FIG. 4, "FAX" serves as the user-specific data. The user cannot display the personal screen before the user logs in. Only after logging in can the user use the function by displaying the personal screen, namely, an operation screen that is unique to the user.

In FIG. 2A, a user data access processing module 202 has a function for passing data that is acquired from user data 205 of the storage 102 (in FIG. 2B) to the function processing module 201 based on a request from the function processing module 201.

The authentication processing module 203 performs user authentication. Specifically, the authentication processing module 203 displays a log-in screen and allows the user to input authentication information (username, password, and the like), and deletes the log-in screen and allows the user to log in only when the authentication information is approved as being valid. One example of the appearance of the log-in screen is shown in FIG. 5.

Figure 5:
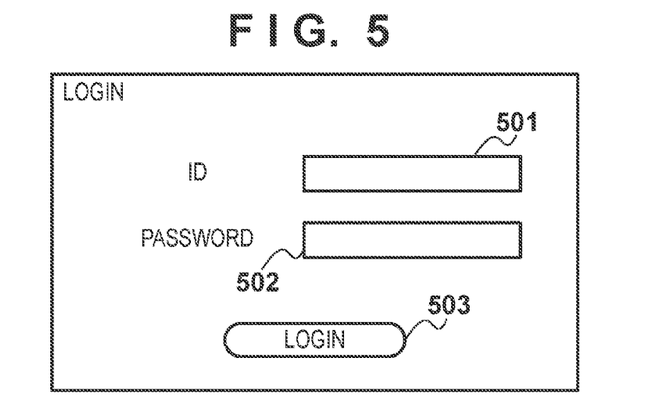
FIG. 5 is a diagram showing an example of a log-in screen.

FIG. 5 is a diagram showing an example of a log-in screen.

The user inputs a user ID (username) in an input field 501 and a password that has been set by the user or has been given to the user in an input field 502, and then presses a log-in button 503. When the user ID and the password match the authentication information registered in the authentication processing module 203, the user authentication by the authentication processing module 203 is successful and thus the user can log in.

In the case where the user has logged in due to the user authentication by the authentication processing module 203, log-in user data 204 stores information on users who have logged in. Moreover, in the case where the user logs out, the information is deleted.

In FIG. 2B, user-specific data is stored in the user data 205 of the storage 102. This data is used by the function processing module 201. In the case of executing a user-specific function, the function processing module 201 of the MFP 101 acquires user data from the user data 205 via the user data access processing module 202 and executes the function using the data.

It should be noted that although in the present embodiment, the storage 102 is described as an apparatus that is external to the MFP 101, which is connected to the MFP 101 via the LAN 103, the function of the storage 102 may be provided in the MFP 101. For example, the user data 205 may be stored in the HDD 113. Moreover, in the case where the storage 102 and the MFP 101 are configured as separate apparatuses as shown in FIG. 1, if another MFP that is different from the MFP 101 is connected to the LAN 103, the other MFP may be allowed to reference the user data 205 of the storage 102.

Figure 6:
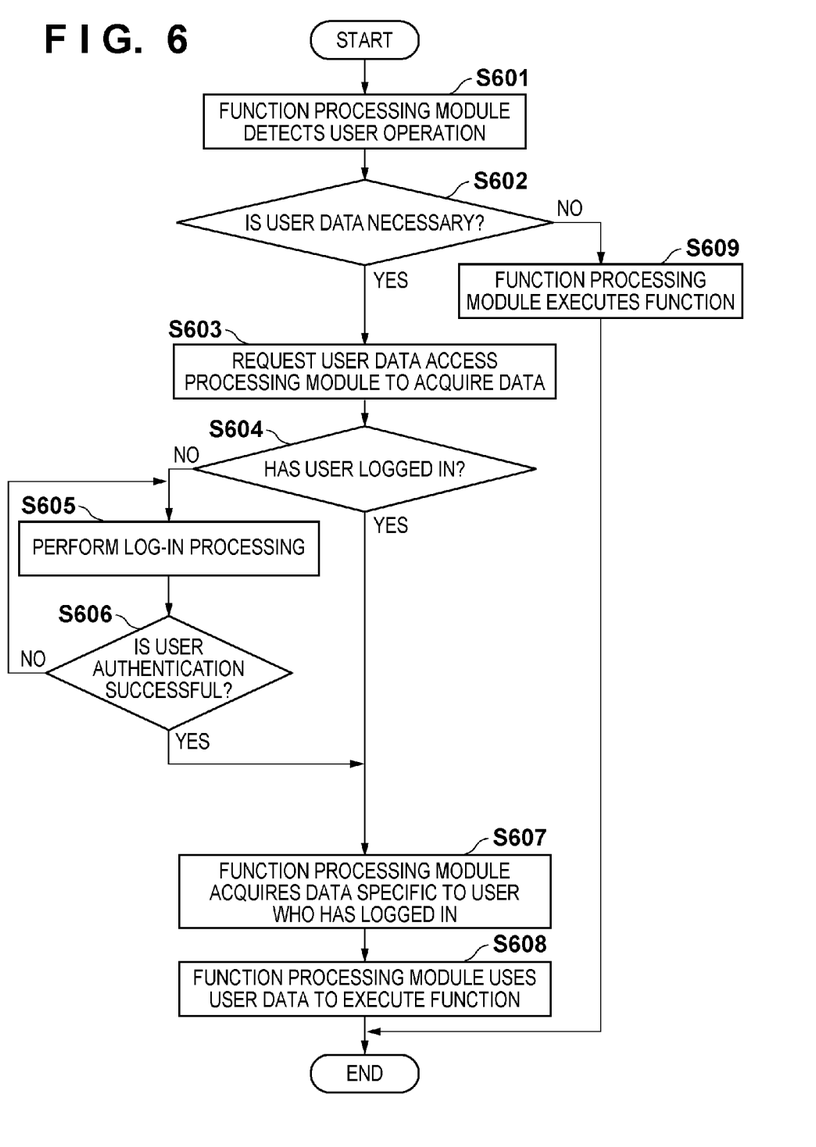
FIG. 6 is a flowchart for describing processing that is executed by the MFP according to the embodiment.

FIG. 6 is a flowchart for describing processing that is executed by the MFP 101 according to the present embodiment. A program that executes the processing is installed in the HDD 113, deployed to the RAM 112 at the time of execution, and executed under control of the CPU 111.

For example, the processing is started by turning on a power source for the MFP 101, and first, in step S601, the user operates the input unit 115, and an execution instruction for any of the functions of the function processing modules 201-1 to 201-*n* is issued. Accordingly, the procedure proceeds to step S602, and it is determined whether data specific to each user (unique to each user) is needed for executing the function that corresponds to the operation. In the case where it is determined that user-specific data is needed, the procedure proceeds to step S603, and the function processing module 201 requests the user data access processing module 202 to acquire the user data. This case corresponds to, for example, the case where the operation for displaying the personal screen in FIG. 4 is performed while the common screen in the portal screen in FIG. 3 is being displayed.

Next, the procedure proceeds to step S604, and the user data access processing module 202 references the log-in user data 204 and determines whether the user has logged in (been authenticated). For example, in the case where user authentication has been performed once prior to the operation in step S601 by the user selecting a function that requires log-in among the functions of the function processing module 201, in step S604, it is determined that the user has logged in. On the other hand, in the case where the user has not selected a function that requires log-in prior to the operation in step S601, in step S604, it is determined that the user has not logged in. In the case where the user has logged in, the procedure proceeds to step S607, and the user data access processing module 202 acquires data specific to the log-in user from the user data 205 and then returns it to the function processing module 201. Accordingly, the procedure proceeds to step S608, and the function processing module 201 uses the received information to execute user-specific processing. For example, in the case of the portal screen, the data "FAX" is acquired and the personal screen is displayed as shown in FIG. 4.

On the other hand, in the case where it is determined in step S604 that the user has not logged in, the procedure proceeds to step S605, and the authentication processing module 203 performs log-in processing. Specifically, the authentication processing module 203 executes display control for displaying the log-in screen shown in FIG. 5, allows the user to input authentication information (username (ID), password and the like), and checks user validity. Accordingly, in the case where the validity of the user is approved in step S606, in other words, in the case where the user authentication is successful, the procedure proceeds to the processing of step S607 in the same manner as in the case where the user has logged in in step S603, and the above-described processing is executed. Moreover, in the case where the user authentication is not successful in step S606, the procedure proceeds to step S605, and the user authentication is performed again by displaying the log-in screen shown in FIG. 5. At this time, in the case where the user is not authenticated even if authentication operations are performed a predetermined number of times, the processing may be suspended.

It should be noted that in step S605, the function processing module 201 is in a state in which it waits for a response from the user data access processing module 202. In other words, while the user performs the log-in operation, the operation of the function processing module 201 stops. Then, if the log-in operation by the user is completed and the user authentication is successful, the function processing module 201 receives a response from the user data access processing module 202, and then continues the processing.

Also, in the case where it is determined in step S602 that the user data is not needed, the procedure proceeds to step S609, and the function processing module 201 executes the instructed function. This case corresponds to, for example, the case where "COPY" or "SCAN" is instructed while the common screen in the portal screen in FIG. 3 is being displayed. It should be noted that in the case where the instructed function of the function processing module is a function that needs log-in and the user has not logged in, log-in processing is performed during the processing of step S609.

Next, a processing flow of another embodiment will be described with reference to FIG. 7.

Figure 7:
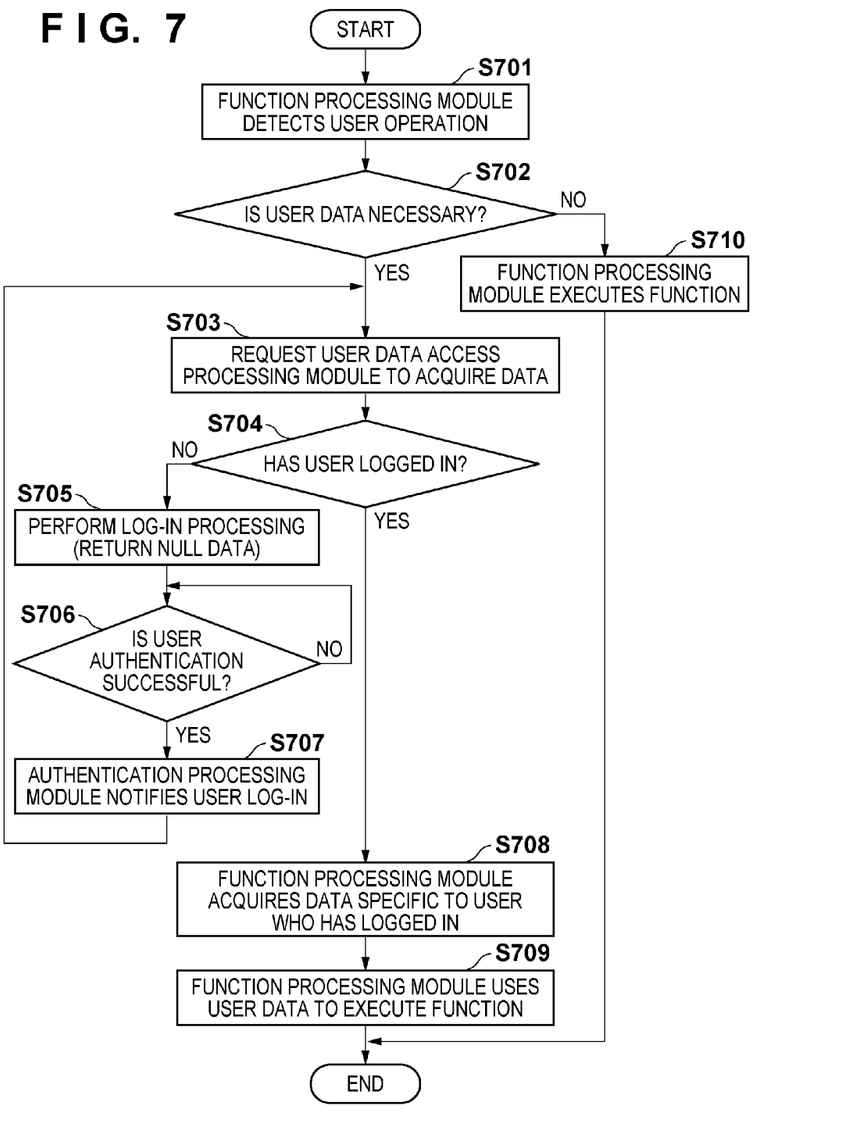
FIG. 7 is a flowchart for describing processing that is executed by the MFP according to another embodiment of the present invention.

FIG. 7 is a flowchart for describing processing that is executed by the MFP 101 according to another embodiment of the present invention. A program that executes this processing is installed in the HDD 113, deployed to the RAM 112 at the time of execution, and executed under control of the CPU 111.

Here, differences between the processing shown in FIG. 6 and the processing shown in FIG. 7 are steps S705 to S707 in FIG. 7. Therefore, since processing of steps S701 to S704 and steps S708 to S710 in FIG. 7 is the same as the processing of steps S601 to S604 and steps S607 to S609 in FIG. 6, the description thereof is omitted.

In step S704, in the case where it is determined that the user has not logged in yet, the procedure proceeds to step S705, and the authentication processing module 203 performs the log-in processing. However, here, the processing is different from the processing in step S605 shown in FIG. 6, and the user data access processing module 202 returns null data to the function processing module 201. Then, if the user authentication is successful in step S706, the procedure proceeds to step S707, and the authentication processing module 203 notifies the function processing module 201 that the user has logged in and then the procedure proceeds to step S703. Accordingly, the function processing module 201 receives the log-in notification, and again requests the user data access processing module 202 to acquire data. At this time, since the user has logged in, it is determined in step S704 that the user has logged in, the procedure proceeds to step S708, and the function processing module 201 acquires the user information, and then performs processing using the information (steps S708 and S709).

In the processing in FIG. 7, while the user performs a log-in operation, a transition state in which the operation of the function processing module 201 stops does not exist. Therefore, in software development of the function processing module 201, an effect of improving development efficiency is obtained in that consideration does not need to be given to the transition state.

It should be noted that although the portal screen shown in FIGS. 3 and 4 is described as the function that needs user-specific data in the embodiments, the function that needs user-specific data is not limited to this. For example, a configuration is possible in which, in the case where an address book includes address book data that is shared by multiple users and address book data that is unique to a specific user, user authentication is performed in order to display the address book data that is unique to the user.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-178110, filed Aug. 16, 2011, which is hereby incorporated by reference herein in its entirety.

What is claimed is:

1. An electronic apparatus having an authentication function being capable of limiting use for each function, comprising:
   a function processing unit configured to execute functions that the electronic apparatus has;
   a determination unit configured to, upon reception of an execution instruction to execute a function from a user, determine whether the function needs data that is set on a user-by-user basis, wherein the function needing the data that is set on a user-by-user basis is a function for displaying an operation screen that is unique to each user; and
   a control unit configured to perform control so as to, in a case where the determination unit determines that the function needs the data, determine whether the user who issued the execution instruction has been authenticated by the authentication function, and in a case of determining that the user has been authenticated, give data that is set for the authenticated user to the function processing unit for executing the instructed function, and cause the instructed function to be executed, and
   perform control so as to, in a case where the user who issued the execution instruction has not been subjected to authentication, cause the authentication function to perform authentication on the user, and in a case where the user is authenticated by the authentication function, give the data that is set for the authenticated user to the function processing unit for executing the instructed function, and cause the instructed function to be executed.

2. The electronic apparatus according to claim 1, wherein the control unit comprises:
   a display control unit configured to, if the user who issued the execution instruction has not logged in, display a screen for performing authentication on the user; and
   an authentication unit configured to perform the authentication function on the user based on a username and a password that were input via the screen.

3. The electronic apparatus according to claim 1, wherein the function needing the data that is set on a user-by-user basis is a function for displaying address book data that is unique to each user.

4. A control method for controlling an electronic apparatus having an authentication function being capable of limiting use for each function, the method comprising:
   a function processing step of executing functions that the electronic apparatus has;
   a determination step of, upon reception of an execution instruction to execute a function from a user, determining whether the function needs data that is set on a user-by-user basis, wherein the function needing the data that is set on a user-by-user basis is a function for displaying an operation screen that is unique to each user; and
   a control step of performing control so as to, in a case where it is determined in the determination step that the function needs the data that is set on a user-by-user basis, determine whether the user who issued the execution instruction has been authenticated by the authentication function, and in a case of determining that the user has been authenticated, give data that is set for the authenticated user to the function processing step for executing the instructed function, and cause the instructed function to be executed, and
   performing control so as to, in a case where the user who issued the execution instruction has not been subjected to authentication, cause the authentication function to perform authentication on the user, and in a case where the user is authenticated by the authentication function, give the data that is set for the authenticated user to the function processing step for executing the instructed function, and cause the instructed function to be executed.

* * * * *